L. WEST.
Corn Planter.
No. 106,898. Patented Aug. 30, 1870.
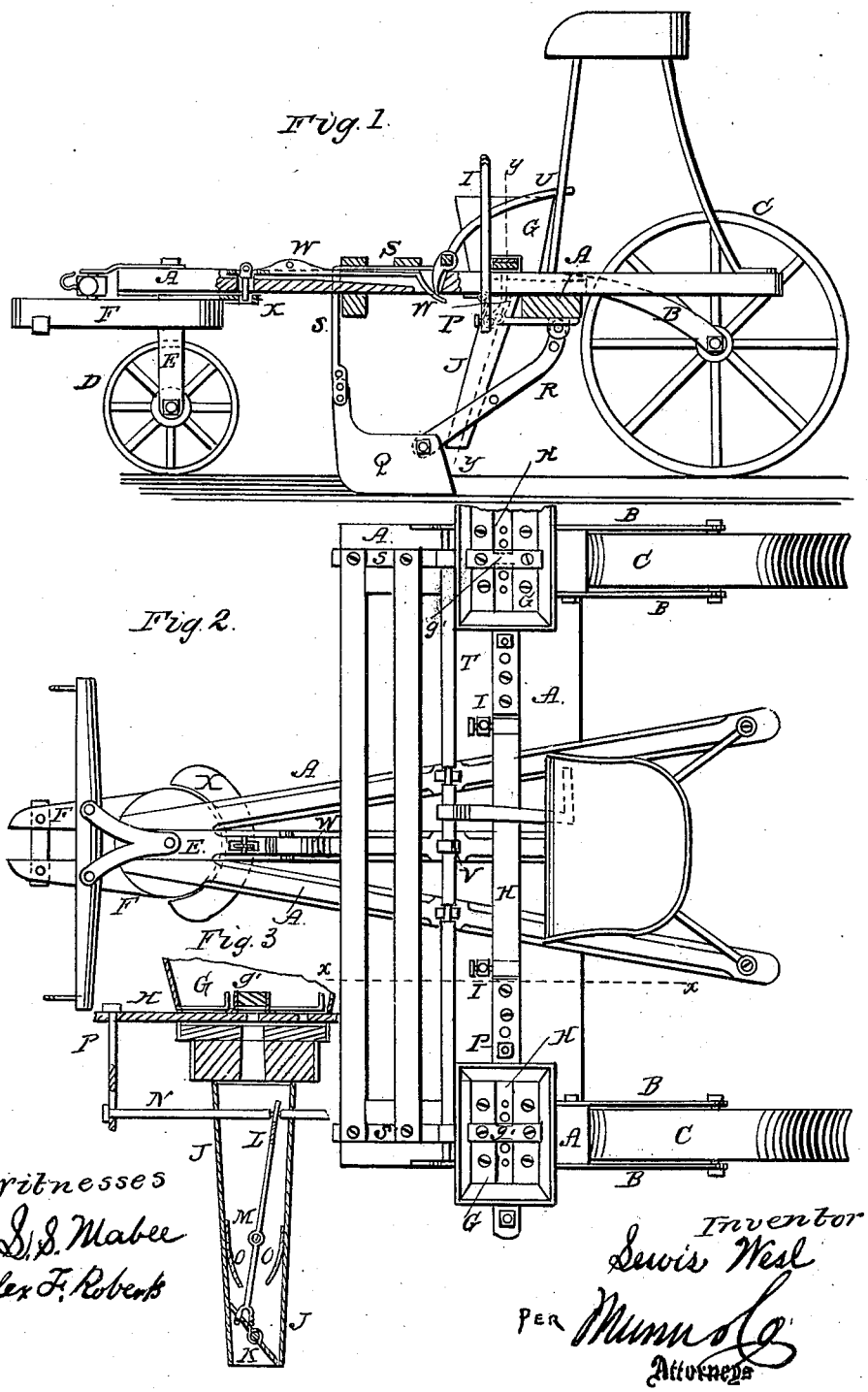

UNITED STATES PATENT OFFICE.

LEWIS WEST, OF GEORGETOWN, KENTUCKY.

IMPROVEMENT IN CORN-PLANTERS.

Specification forming part of Letters Patent No. 106,898, dated August 30, 1870.

*To all whom it may concern:*

Be it known that I, LEWIS WEST, of Georgetown, in the county of Scott and State of Kentucky, have invented a new and useful Improvement in Corn-Planters; and I do hereby declare that the following is a full, clear, and exact description thereof, which will enable others skilled in the art to make and use the same, reference being had to the accompaning drawing, forming part of this specification, in which—

Figure 1 is a vertical longitudinal section of my improved machine, taken through the line $x\ x$, Fig. 2. Fig. 2 is a top view of the same. Fig. 3 is a detail sectional view of the same, taken through the line $y\ y$, Fig. 1.

Similar letters of reference indicate corresponding parts.

My invention has for its object to furnish an improved corn-planter, simple in construction and effective in operation, doing its work accurately and well; and it consists in the construction and combination of the various parts of the machine, as hereinafter more fully described.

A is the frame of the machine, to the rear ends of the side bars of which are attached arms or brackets B, to and between the rear ends of which are pivoted the wheels C. The rims of the wheels C are made broad, and are concaved, as shown in Fig. 2, so as to serve as coverers to press in the sides of the furrow and cover the seed.

D is the forward or third wheel, which is pivoted to the forwardly-projecting central part of the frame A by a stirrup-bolt, E, as shown in Fig. 1. F are the hounds, to which the tongue is attached, and which are rigidly connected to the stirrup-bolt E. G are the seed boxes or hoppers, which are attached to the side bars of the frame A directly in front of the wheels C. In the bottom of the hoppers G are formed grooves, in which slide the end parts of the bar H, said bar passing beneath the short bar or plate $g'$, crossing the middle part of the said hopper. The discharge-opening in the bottom of the hoppers G is directly beneath the bar $g'$. In the end parts of the bar H are formed two holes, of such a size as to contain enough seed for a hill, and at such a distance apart that when one of said holes is beneath the bar $g'$, discharging the seed, the other may be in the open part of the hopper to receive the seed for another hill, a hill being thus planted at each movement of the said bar H. The bar H is moved to drop the seed by the lever or levers I, pivoted to said bar, and the lower ends of which are pivoted to the frame A.

J are the conductor-spouts, which receive the seed from the discharge-openings of the hopper G, and conduct it into the furrow in the rear of the opening-plow, and the upper ends of which are hinged to the frame A. K is a valve or plate, pivoted at or near the middle of its side edges to the sides of the spout J, to receive the seed as it is dropped into the spout and detain it until it is dropped to the ground. To the upper edge of the plate K is pivoted the lower end of the lever L, which is pivoted to a bolt or pin, M, passing through the spout J, and the upper end of which is pivoted to the rod N, passing horizontally through the upper part of the spout J, so that the plate or valve K may be shifted to drop the seed by the longitudinal movement of the said rod N.

O are inclined plates, attached to the sides of the spout J, above the upper and lower ends of the plate or valve K, so that it will be impossible for any of the kernels entering the spout to pass the plate K and be dropped with the kernels of the previous hill.

The ends of the rod N, upon both sides of the spouts J, pass through curved slots in the lower ends of the arms P, to allow the lower ends of the spouts J to be raised from the ground when desired.

The upper ends of the arms P are rigidly attached to the bar H, so that as the bar H is moved to drop the seed the arms P may move the rod N by striking against collars or nuts formed upon or attached to said rods N.

Q are the opening-plows, the rear parts of which are made forked to receive the lower end of the spout J, to introduce the seed to the bottom of the furrow opened by the said plows Q. To the upper parts of the rear or branched ends of the plows Q are pivoted the forward ends of the bars R, which pass back one upon each side of each of the spouts J, and their rear ends are pivoted to the rear parts of the side bars of the frame A.

The bars R are connected just in the rear of the spouts J by a pin or bolt, which, when the plows Q are raised from the ground, strike against the rear side of the lower parts of the hinged spouts J and raise them with said plows.

To the upper forward ends of the plows Q are pivoted the lower ends of the bars S, which are bent at or nearly at right angles, to pass over the front edge of the frame A, and are secured to the shaft T by set-screws or other convenient detachable means.

The bars R and S are adjustably attached to the plows Q, so that the said plows may be adjusted to run deeper or shallower in the ground, as may be required.

The shaft T works in bearings attached to the frame A, and has a lever, U, rigidly attached to it, in such a position that the driver from his seat may easily operate it to raise the plows Q from the ground.

To the shaft T is also rigidly attached a cam, V, which operates the lever W. The lever W is pivoted to the frame A, and its forward end has a pin attached to it, which passes through a hole in the forwardly-projecting middle part of the frame A, and enters a hole in the semicircular plate X, connected with the rear ends of the tongue-hounds F, said hole being formed in said plate in such a position that the said catch-pin can only drop into it when the tongue is straight forward, so as to rigidly connect the tongue, when in this position, with the frame of the machine, to give steadiness of motion to said machine when moving straight forward, and thus guard against jogs or irregularities in the rows from one of the wheels striking an obstruction.

When the plows Q are raised from the ground by operating the lever U the same movement raises the pin of the catch-lever W from the hole in the plate X and releases the wheel D, allowing it to act as a pivot-wheel, for convenience in turning or in guiding the machine when passing from place to place, the said pin being held raised as long as the plows are held away from the ground.

Y are pins attached to the bar H, within the hoppers G, and upon each side of the dropping-holes of said bars, to agitate the corn and prevent it from clogging or forming arches over the said dropping-holes, to prevent its free passage into the dropping-holes of the said bar.

Having thus described my invention, I claim as new and desire to secure by Letters Patent—

1. The arrangement of the pivoted third wheel, D, independent hounds F F, frame A, and stirrup-bolt E, as and for the purpose specified.

2. The combination of the guide-plates O, pivoted plate K, lever L, rods N, and slotted arms P with the conductor-spouts J and dropping-bar H, substantially as herein shown and described, and for the purpose set forth.

3. The combination of the pivoted bars R, pivoted bent bars S, shaft T, and lever U, with each other and with the conductor-spouts J, opening-plows Q, and frame A of the planter, substantially as herein shown and described, and for the purpose set forth.

4. The combination of the cam V, catch-pin lever W, and plate X, or equivalent, with the shaft T, frame A, and tongue-hounds F, or other support, rigidly connected with the pivoted third-wheel standard, substantially as herein shown and described, and for the purposes set forth.

LEWIS WEST.

Witnesses:
  G. W. DAVIS,
  J. HENRY WOLFE.